(12) United States Patent
Tsai et al.

(10) Patent No.: US 7,451,349 B2
(45) Date of Patent: Nov. 11, 2008

(54) SYSTEM AND METHOD FOR AUTOMATICALLY TESTING MOTHERBOARDS

(75) Inventors: Hung-Yuan Tsai, Tu-Cheng (TW); San Xiao, Shenzhen (CN); Ge-Xin Zeng, Shenzhen (CN)

(73) Assignees: Hong Fu Jin Precision Indsutry (Shenzhen) Co., Ltd., Bao-an District, Shenzhen, Guangdong Province (CN); Hon Hai Precision Indsutry Co., Ltd., Tu-Cheng, Taipei Hsien (TW)

( * ) Notice: Subject to any disclaimer, the term of this patent is extended or adjusted under 35 U.S.C. 154(b) by 552 days.

(21) Appl. No.: 11/107,087

(22) Filed: Apr. 15, 2005

(65) Prior Publication Data

US 2005/0246589 A1 Nov. 3, 2005

(30) Foreign Application Priority Data

Apr. 16, 2004 (TW) ............... 93110631 A

(51) Int. Cl.
*G06F 11/00* (2006.01)
(52) U.S. Cl. .............. 714/27; 714/25; 702/118
(58) Field of Classification Search .............. 714/27
See application file for complete search history.

(56) References Cited

U.S. PATENT DOCUMENTS

| | | | | | |
|---|---|---|---|---|---|
| 5,136,705 | A | * | 8/1992 | Stubbs et al. | 714/27 |
| 5,513,315 | A | * | 4/1996 | Tierney et al. | 714/37 |
| 5,796,938 | A | * | 8/1998 | Emberty et al. | 714/27 |
| 5,878,050 | A | * | 3/1999 | Brahme et al. | 714/719 |
| 5,963,743 | A | * | 10/1999 | Amberg et al. | 717/174 |
| 5,978,919 | A | * | 11/1999 | Doi et al. | 726/36 |
| 5,991,543 | A | * | 11/1999 | Amberg et al. | 717/175 |
| 5,995,757 | A | * | 11/1999 | Amberg et al. | 717/175 |
| 6,003,081 | A | * | 12/1999 | Cromer et al. | 709/224 |
| 6,011,830 | A | * | 1/2000 | Sasin et al. | 379/10.03 |
| 6,029,257 | A | * | 2/2000 | Palmer | 714/40 |
| 6,061,812 | A | * | 5/2000 | Holzmann et al. | 714/38 |
| 6,175,934 | B1 | * | 1/2001 | Hershey et al. | 714/25 |

(Continued)

FOREIGN PATENT DOCUMENTS

CN    1431595 A    7/2003

(Continued)

*Primary Examiner*—Marc Duncan
*Assistant Examiner*—Joshua P Lottich
(74) *Attorney, Agent, or Firm*—Morris Manning & Martin LLP; Tim Tingkang Xia, Esq.

(57) ABSTRACT

A system for automatically testing motherboards includes a test server (1), client computers (2), and a network (5) connecting the test server with the client computers. The test server is for storing a plurality of high-level OSs (Operating Systems), test programs and test script files, for setting contents of test configuration files, and for storing test results. Each client computer has a motherboard installed therein, and is operated under a DOS (Disk Operating System). The client computer downloads and installs a high-level OS from the test server, downloads and installs one or more test programs and a test script file according to a test configuration file set by the test server, executes the test script file to auto-run test programs in a sequence specified in the test configuration file, and then transmits test results to the test server.

10 Claims, 2 Drawing Sheets

U.S. PATENT DOCUMENTS

| | | | |
|---|---|---|---|
| 6,243,835 B1 * | 6/2001 | Enokido et al. | 714/38 |
| 6,260,065 B1 * | 7/2001 | Leiba et al. | 709/224 |
| 6,260,160 B1 * | 7/2001 | Beyda et al. | 714/27 |
| 6,314,455 B1 * | 11/2001 | Cromer et al. | 709/217 |
| 6,327,706 B1 * | 12/2001 | Amberg et al. | 717/174 |
| 6,401,218 B1 * | 6/2002 | Linam et al. | 714/25 |
| 6,411,678 B1 * | 6/2002 | Tomlinson et al. | 379/1.01 |
| 6,415,392 B1 * | 7/2002 | Suzuki et al. | 714/27 |
| 6,418,541 B1 * | 7/2002 | Jeon | 714/36 |
| 6,480,972 B1 * | 11/2002 | Cromer et al. | 714/25 |
| 6,509,754 B2 | 1/2003 | Lin et al. | |
| 6,530,041 B1 * | 3/2003 | Furusawa et al. | 714/45 |
| 6,543,047 B1 * | 4/2003 | Vrhel et al. | 717/121 |
| 6,581,169 B1 * | 6/2003 | Chen et al. | 714/47 |
| 6,587,969 B1 * | 7/2003 | Weinberg et al. | 714/46 |
| 6,615,406 B1 * | 9/2003 | Amberg et al. | 717/177 |
| 6,651,190 B1 * | 11/2003 | Worley et al. | 714/43 |
| 6,691,253 B1 * | 2/2004 | Gillenwater et al. | 714/36 |
| 6,697,962 B1 * | 2/2004 | McCrory et al. | 714/27 |
| 6,751,569 B2 * | 6/2004 | Merkin et al. | 702/120 |
| 6,785,844 B2 * | 8/2004 | Wong et al. | 714/25 |
| 6,810,364 B2 * | 10/2004 | Conan et al. | 702/188 |
| 6,810,494 B2 * | 10/2004 | Weinberg et al. | 714/46 |
| 6,892,328 B2 * | 5/2005 | Klein et al. | 714/42 |
| 6,904,389 B2 * | 6/2005 | Hornberger et al. | 702/188 |
| 6,925,586 B1 * | 8/2005 | Perrella et al. | 714/57 |
| 6,938,243 B1 * | 8/2005 | Zeevi et al. | 717/124 |
| 6,947,675 B2 * | 9/2005 | Koyama et al. | 399/8 |
| 6,948,095 B2 * | 9/2005 | Phillips | 714/27 |
| 6,959,433 B1 * | 10/2005 | Morales et al. | 717/127 |
| 7,024,660 B2 * | 4/2006 | Andrade et al. | 717/124 |
| 7,099,801 B1 * | 8/2006 | McBride et al. | 702/188 |
| 7,099,934 B1 * | 8/2006 | Ewing et al. | 709/223 |
| 7,100,082 B2 * | 8/2006 | Little et al. | 714/26 |
| 7,100,083 B2 * | 8/2006 | Little et al. | 714/26 |
| 7,103,802 B2 * | 9/2006 | Stephens et al. | 714/32 |
| 7,134,049 B2 * | 11/2006 | Gillenwater et al. | 714/25 |
| 7,168,003 B2 * | 1/2007 | Lozano et al. | 714/25 |
| 7,200,775 B1 * | 4/2007 | Rhea et al. | 714/27 |
| 7,249,174 B2 * | 7/2007 | Srinivasa et al. | 709/223 |
| 7,263,450 B2 * | 8/2007 | Hunter | 702/65 |
| 7,287,190 B2 * | 10/2007 | Rosenman et al. | 714/32 |
| 2003/0005362 A1 * | 1/2003 | Miller et al. | 714/27 |
| 2003/0060996 A1 * | 3/2003 | Yi et al. | 702/121 |
| 2004/0078670 A1 * | 4/2004 | Mizumaki | 714/27 |
| 2004/0162898 A1 * | 8/2004 | Rich | 709/224 |
| 2004/0193873 A1 * | 9/2004 | England | 713/156 |
| 2004/0199809 A1 * | 10/2004 | Hanam et al. | 714/4 |
| 2004/0199815 A1 * | 10/2004 | Dinker et al. | 714/21 |
| 2005/0138473 A1 * | 6/2005 | Mathew et al. | 714/27 |
| 2005/0204243 A1 * | 9/2005 | Hu et al. | 714/742 |
| 2005/0240815 A1 * | 10/2005 | Purkeypile et al. | 714/15 |
| 2007/0220370 A1 * | 9/2007 | Branda et al. | 714/49 |

FOREIGN PATENT DOCUMENTS

CN           1431595 A  *  7/2003

* cited by examiner

SYSTEM AND METHOD FOR AUTOMATICALLY TESTING MOTHERBOARDS

BACKGROUND OF THE INVENTION

1. Field of the Invention

The present invention is related to systems and methods for testing motherboards installed in computers, and more particularly to a system and method for testing motherboards of client computers automatically by using a test server.

2. Prior Art

A motherboard is a main component of a typical personal computer. The motherboard may provide a south-bridge chipset, a north-bridge chipset, a plurality of buses, and interfaces for peripheral devices. Reliability and compatibility with other components count for much.

Usually, the reliability and compatibility of a new motherboard are tested before the motherboard leaves the factory. Generally, a motherboard is installed in a testing computer which has had a plurality of test programs already installed therein. An operator works the testing computer to execute each of the test programs one-by-one to obtain test results.

However, because there are normally various test programs to be executed, and all the test programs must be installed in a single testing computer, the test procedure generally consumes too much time. Also, the test procedure cannot work without an operator working the testing computer.

To solve the problems disclosed above, recent patents or applications in the art include China patent application No. 02152981.7 entitled "Method and system for testing motherboards automatically" and published on Jul. 23, 2003. The patent application discloses a method for automatically testing a motherboard installed in a testing computer by using a testing server. The method comprises the steps of: selecting test items for the motherboard; selecting a high-level OS (Operating System); connecting the testing computer with the testing server; downloading and installing the high-level OS from the testing server; downloading test programs for the selected test items; installing the test programs; and executing each of the test programs and then transmitting test results to the testing server.

However, the testing method described above only provides final test results. Sometimes monitoring of the testing process is desirable, especially for detecting and dealing with any error that may occur during the testing process.

What is needed, therefore, is a system and method for testing motherboards automatically, in which a function of monitoring the testing process is provided.

SUMMARY

A preferred embodiment of the present invention provides a system for automatically testing motherboards (hereinafter, "the system"). The system may include a test server, a plurality of client computers, and a network for connecting the test server with the client computers. The test server is used for storing a plurality of high-level OSs (Operating Systems), test programs and test script files, for setting contents of test configuration files, and for storing test results. Each of the client computers has a motherboard to be tested installed therein, operates under a DOS (Disk Operating System) connecting to the test server, downloads and installs a high-level OS from the test server, downloads and installs test programs and a test script file according to a test configuration file set by the test server, tests the motherboard by executing the test script file to auto-run test programs in a sequence specified in the test configuration file, and then transmits test results to the test server.

The preferred embodiment of the present invention also provides a method for testing a motherboard automatically (herein after, "the method"). The method may include the steps of: providing a test server and a client computer in which the motherboard to be tested is installed; connecting the client computer with the test server, and downloading and installing a high-level OS (Operating System) from the test server setting contents of a test configuration file in the test server, and transmitting the test configuration file to the client computer; downloading test programs and a test script file according to the test configuration file; installing the test programs and the test script file; testing the motherboard installed in the client computer by executing the test script file to auto-run the test programs in a sequence specified in the test configuration file; and transmitting test results to the test server.

Other objects, advantages and novel features of the invention will become more apparent from the following detailed description when taken in conjunction with the accompanying drawings, in which:

DETAILED DESCRIPTION OF THE INVENTION

Figure 1:
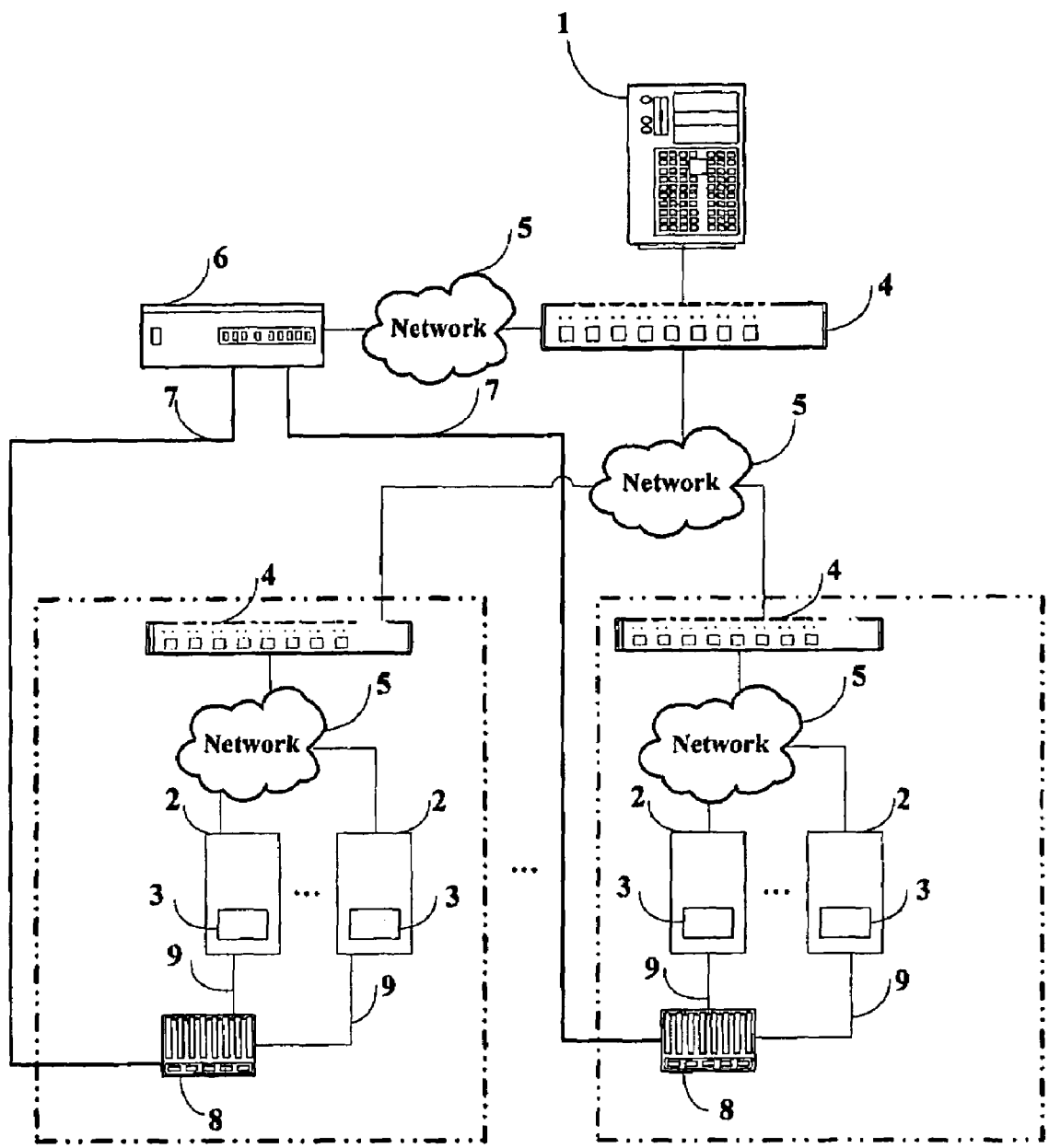
FIG. 1 is a schematic diagram of hardware configuration of a system for automatically testing motherboards in accordance with the preferred embodiment of the present invention.

FIG. 1 is a schematic diagram of hardware configuration of a system for automatically testing motherboards (hereinafter, "the system") in accordance with the preferred embodiment of the present invention. The system typically includes a test server 1, a plurality of client computers 2 (four shown), and one or more networks 5 connecting the test server 1 with the client computers 2. There can be a router 4 between two networks 5 for connecting the networks 5. The system may further comprise a serial device server 6 and a plurality of power controllers 8. The serial device server 6 and the power controllers 8 are connected via serial lines 7. Each power controller 8 is connected with a certain number of client computers 2 via power control lines 9. The test server 1 controls power sources of the client computers 2 through the serial device server 6. Each client computer 2 is installed with a motherboard 3 to be tested. Each network 5 is an electronic communications network that supports a Transmission Control Protocol and an Internet Protocol (TCP/IP). The network 5 can be an intranet, the Internet, or any other suitable type of communications network.

The test server 1 is provided for storing a plurality of high-level OSs (Operating Systems), test programs and test script files, for setting contents of test configuration files and for storing test results. Each client computer 2 is connected to the test server 1 under a DOS (Disk Operating System). The client computer 2 can download and install a high-level OS, one or more test programs, a test script file and a test configuration file from the test server 1, and transmit test results to the test server 1 through the network(s) 5. The high-level OS can be Microsoft Windows 95, Microsoft Windows 98, Microsoft Windows 2000, Microsoft Windows NT, a Unix OS, or a Linux OS. The test programs can be used to test the motherboard 3 installed in the client computer 2. The test configuration file includes hardware configuration of the client computer 2, a list of the test programs and the test script file and their locations stored in the test server 1, a sequence in which the test programs are executed during the process of testing the motherboard 3, a test time limitation, and exceptional procedures when any error occurs during a downloading process or testing process. The test script file can be executed to auto-run the test programs in the sequence specified in the test configuration file, in order to test the motherboard 3.

Figure 2:
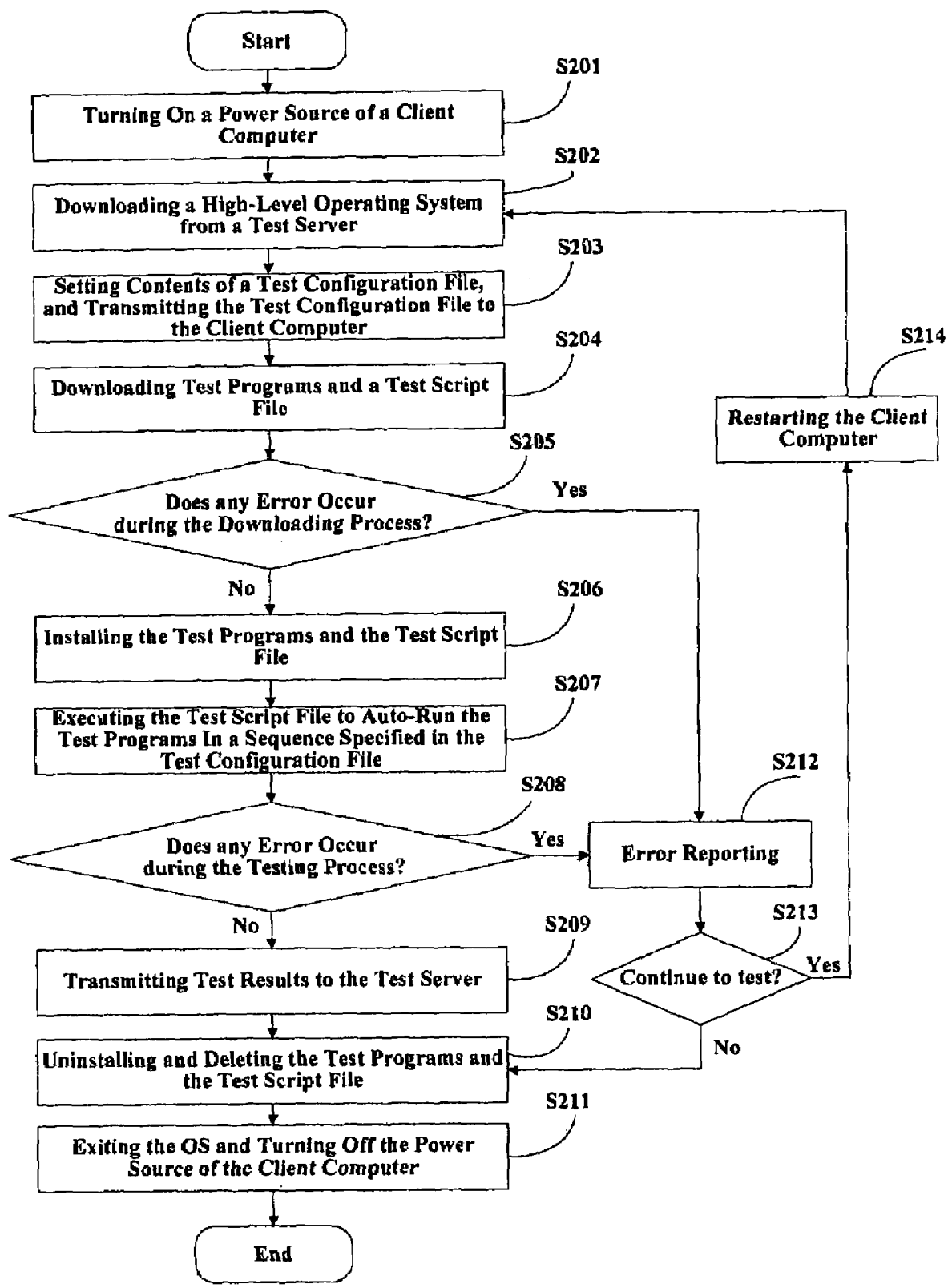
FIG. 2 is a flowchart of the preferred method of implementing the system for testing a motherboard in a client computer, in accordance with the preferred embodiment of the present invention.

FIG. 2 is a flowchart of the preferred method of implementing the system to test a motherboard 3 installed in a client computer 2, in accordance with the preferred embodiment of the present invention. In step S201, the test server 1 turns on a power source of the client computer 2, by the serial device server 6 sending a corresponding command to a power controller 8 connected to the client computer 2. Once powered on, the client computer 2 loads a DOS and connects to the test server 1. In step S202, the client computer 2 downloads a high-level OS from the test server 1, and installs the high-level OS on itself. In step S203, the test server 1 sets contents of a test configuration file for the client computer 2, and transmits the test configuration file to the client computer 2.

Specifically, the setting step may include the steps of: setting hardware configuration of the client computer 2; determining a list of test programs and a test script file, and their locations stored in the test server 1; determining the sequence in which the test programs are executed in the client computer 2 when testing the motherboard 3; setting a test time limitation; and determining exceptional procedures for when any error occurs during a downloading process or testing process.

In step S204, the client computer 2 receives the test configuration file, and downloads the test programs and the test script file according to the test configuration file from the test server 1. In step S205, the client computer 2 determines whether any error occurs during the process of downloading the test programs and the test script file.

If any error occurs during the downloading process, the procedure goes directly to step S212 described below. Otherwise, if no error occurs during the downloading process, in step S206, the client computer 2 installs the test programs and the test script file on itself. In step S207, the client computer 2 executes the test script file to auto-run the test programs in the sequence specified in the test configuration file, in order to test the motherboard 3 of the client computer 2. In step S208, the client computer 2 determines whether any error occurs during the testing process.

If any error occurs during the testing process, the procedure goes directly to step S212 described below. Otherwise, if no error occurs during the testing process, in step S209, the client computer 2 transmits test results to the test server 1. Then in step S210, the client computer 2 uninstalls and deletes the test programs and the test script file which have been downloaded from the test server 1. Then in step S211, the client computer 2 exits the high-level OS, and the test server 1 turns off the power source of the client computer 2 by way of the serial device server 6 sending a corresponding command to the power controller 8 connected to the client computer 2.

When any error occurs during the downloading process or the testing process, in step S212, the client computer 2 reports the error to the test server 1. Then in step S213, the client computer 2 determines whether to continue to test the motherboard 3 according to the test configuration file. If the client computer 2 determines not to continue to test the motherboard 3, the procedure goes to step S210 described above. Otherwise, if the client computer 2 determines to continue to test the motherboard 3, in step S214, the test server 1 restarts the client computer 2, and then the procedure returns to the step S202 described above.

The above-described steps of the method can be repeated by the test server 1 in order to test motherboards 3 of various client computers 2 one by one or synchronously according to user requirements.

Although the present invention has been specifically described on the basis of a preferred embodiment and preferred method, the invention is not to be construed as being limited thereto. Various changes or modifications may be made to the embodiment and method without departing from the scope and spirit of the invention.

We claim:

1. A system for automatically testing motherboards, comprising:

a test server for storing a plurality of high-level OSs (Operating Systems), test programs and test script files, for setting contents of test configuration files, and for storing test results;

a plurality of client computers in which motherboards to be tested are installed, each of the client computers configured for operating under a DOS (Disk Operating System), downloading and installing a high-level OS from the test server, downloading and installing test programs and a test script file according to a test configuration file that comprises hardware configuration of each of the client computers, a list of the test programs and the test script file and locations of the test programs and the test script file stored in the test server, executing the test script file to auto-run the test programs in a sequence specified in the test configuration file, transmitting test results to the test server, and uninstalling and deleting the test programs and the test script file if testing of the motherboard does not need to be continued according to the test configuration file;

a serial device server and a plurality of power controllers for the test server to control power sources of the client computers; and a network for connecting the test server with the client computers.

2. The system as claimed in claim 1, wherein the test configuration file further comprises the sequence in which the test programs are executed during testing the motherboard, a test time limitation, and exceptional procedures when any error occurs during downloading the test programs and the test script file or testing the motherboard.

3. A method for testing a motherboard automatically, comprising the steps of:

providing a test server and a client computer in which the motherboard to be tested is installed;

providing a serial device server and a power controller for the test server to control a power source of the client computer;

connecting the client computer with the test server, and downloading and installing a high-level OS (Operating System) from the test server;

setting contents of a test configuration file in the test server, comprising:

setting hardware configuration of the client computer; and determining a list of test programs and a test script file, and locations of the test programs and the test script file stored in the test server;

transmitting the test configuration file to the client computer;

downloading the test programs and the test script file according to the test configuration file;

installing the test programs and the test script file;

testing the motherboard installed in the client computer by executing the test script file to auto-run the test programs in a sequence specified in the test configuration file;

transmitting test results to the test server;

the client computer determining whether to continue to test the motherboard according to the test configuration file; and uninstalling and deleting the test programs and the test script file from the client computer, if the client computer determines not to continue to test the motherboard according to the test configuration file.

4. The method as claimed in claim 3, wherein the setting step comprises the steps of:

determining the sequence in which the test programs are executed in the client computer;

setting a test time limitation; and setting exceptional procedures for when any error occurs during downloading the test programs and the test script file or testing the motherboard.

5. The method as claimed in claim 3, further comprising the step of exiting the high-level OS and turning off the power source of the client computer after transmitting test results to the test server.

6. The method as claimed in claim 3, further comprising the step of reporting to the test server when any error occurs on the client computer during downloading the test programs and the test script file or testing the motherboard.

7. The method as claimed in claim 3, further comprising the step of the test server restarting the client computer and returning to the step of downloading and installing a high-level OS from the test server, if the client computer determines to continue to test the motherboard according to the test configuration file.

8. A method for testing a motherboard automatically, comprising the steps of:

connecting a client computer in which the motherboard to be tested is installed with a test server;

providing a serial device server and a power controller for the test server to control a power source of the client computer;

downloading and installing an operating system (OS) from the test server;

setting contents of a test configuration file in the test server;

transmitting the test configuration file to the client computer;

downloading test programs and a test script file according to the test configuration file;

assuring availability of the test programs and the test script file by verifying whether any error occurs during downloading the test programs and the test script file;

installing the test programs and the test script file if no error occurs during downloading the test programs and the test script file;

testing the motherboard in a sequence specified in the test configuration file by executing the test script file to auto-run the test programs;

determining whether to continue to test the motherboard according to the test configuration file; and uninstalling and deleting the test programs and the test script file from the client computer, if the client computer determines not to continue to test the motherboard according to the test configuration file.

9. The method as claimed in claim 8, further comprising the step of reporting to the test server when any error occurs during downloading the test programs and the test script file or testing the motherboard.

10. The method as claimed in claim 8, wherein the setting step comprises the steps of:

setting hardware configuration of the client computer;

determining a list of the test programs and the test script file, and locations of the test programs and the test script file stored in the test server;

determining the sequence in which the test programs are executed in the client computer;

setting a test time limitation; and setting exceptional procedures for when any error occurs during downloading the test programs and the test script file or testing the motherboard.

* * * * *